(12) United States Patent
Pennington (10) Patent No.: US 9,221,321 B2
(45) Date of Patent: Dec. 29, 2015

(54) CONVERTIBLE CORVETTE WIND BLOCKER

(75) Inventor: Stephen Pennington, Garland, TX (US)

(73) Assignee: King Penn Industries, Inc., Dallas, TX (US)

( * ) Notice: Subject to any disclaimer, the term of this patent is extended or adjusted under 35 U.S.C. 154(b) by 0 days.

(21) Appl. No.: 13/362,012

(22) Filed: Jan. 31, 2012

(65) Prior Publication Data

US 2012/0217767 A1 Aug. 30, 2012

Related U.S. Application Data

(60) Provisional application No. 61/447,096, filed on Feb. 27, 2011.

(51) Int. Cl.
*B60J 7/22* (2006.01)

(52) U.S. Cl.
CPC ........................................ *B60J 7/223* (2013.01)

(58) Field of Classification Search
CPC .... B60J 7/223; B60J 1/20; B60N 2002/4405; B60N 2/441
USPC ............... 296/180.1, 180.5, 85, 91, 200, 201, 296/217, 218, 219
See application file for complete search history.

(56) References Cited

U.S. PATENT DOCUMENTS

| | | | | |
|---|---|---|---|---|
| 4,838,604 A | * | 6/1989 | Kochi | 296/180.5 |
| 6,352,300 B1 | * | 3/2002 | Beal | 296/180.1 |
| 6,767,042 B2 | * | 7/2004 | Currle et al. | 296/85 |
| 2002/0041111 A1 | * | 4/2002 | Schmitt | 296/180.5 |
| 2008/0238155 A1 | * | 10/2008 | Pennington | 296/217 |
| 2010/0276968 A1 | * | 11/2010 | Rossi | 296/180.1 |

FOREIGN PATENT DOCUMENTS

| | | | |
|---|---|---|---|
| DE | 10336483 A1 | * | 3/2005 |
| GB | 190208 A | * | 12/1922 |
| JP | 2006224907 A | * | 8/2006 |

* cited by examiner

*Primary Examiner* — Jason S Morrow
*Assistant Examiner* — E Turner Hicks
(74) *Attorney, Agent, or Firm* — Winstead PC (57) ABSTRACT

The wind blocker allows the simple and inexpensive manufacture of a wind blocker for the convertible C5 and C6 Corvette which utilizes illuminated text and/or artwork. The design of the wind blocker allows such text or artwork to be quickly and inexpensively applied based on customer requirements. The use of computer aided etching techniques allow the wind blocker to be cost effectively manufactured with custom artwork in quantities as low as one item. This allows the end customer to utilize any artistic design desired to create a completely custom, one-of-a-kind accessory for the customer's C5 or C6 Corvette.

20 Claims, 15 Drawing Sheets

CONVERTIBLE CORVETTE WIND BLOCKER

CROSS-REFERENCE TO RELATED APPLICATIONS

This application claims priority to provisional application No. 61/447,096, filed on Feb. 27, 2011, which application is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates to a wind blocking device for a convertible automobile and particularly suited for a C6 convertible CORVETTE (model years 2005-present) and a C5 convertible CORVETTE (model years 1997-2004) as manufactured by General Motors. Several wind blocking devices have been manufactured for convertibles and for the C5 and C6 CORVETTE. However, due to deficiencies in the design of the wind blocking panel and its related mounting system, all other wind blocking devices for the C5 and C6 CORVETTE require the wind blocking device to be removed in order to operate the convertible top between the open and closed positions. The present invention, on the other hand, is unique in that it is designed and mounted in such a way that the convertible top can be opened and closed without disturbing the wind blocking device and the present invention also incorporates text or art work which may be abraded onto a solid transparent or translucent wind blocker and then illuminated for dramatic effect.

BRIEF SUMMARY OF THE INVENTION

The present invention provides a wind blocker for a convertible automobile which allows the convertible top to be opened and closed without the necessity of removing the wind blocker. In a preferred embodiment, the wind blocker is made of a transparent or translucent material which is abraded with text or art work and illuminated for a dramatic artistic effect.

The present invention provides a device which comprises a solid panel, bends in the panel to follow the contour of the interior of a convertible C5 OR C6 CORVETTE as manufactured by General Motors, and a means for attaching the panel to such convertible. In one embodiment of the invention, the panel is of a transparent or translucent material with abrasions on the face of the panel and a means of illumination. The subject device is installed in a convertible automobile such that it projects upwards beyond a seat belt tower of the automobile and provides a customized artistic presentation while redirecting airflow through the passenger compartment of the automobile.

DETAILED DESCRIPTION OF THE INVENTION

A convertible automobile wind blocking device comprising a solid panel 20 which projects upwards beyond a seat belt tower 18 of the convertible automobile, and that has a face 1, two first bends 2 an equal distance from a centerline of the panel, two second bends 3 an equal distance from the centerline of the panel, an edge 4, two sets of mounting holes 5, a means of attaching the panel 20 to the automobile, an abrasion 19 in the face 1 and a means of illumination. Additionally, the panel has two cutouts 34 arranged to provide clearance for a seat latch of a convertible automobile.

The wind blocking device is made in the following manner. In the preferred embodiment, the panel 20 is made from an acrylic plastic. In the preferred embodiment, the panel 20 is cut and bent into a predetermined shape to fit behind seats of a convertible automobile and generally follow the contour of a rear passenger compartment of the automobile. In the preferred embodiment, the first bends 2 and the second bends 3 are 52 degrees and 48 degrees, respectively. However, it should be understood that any number of angles could be accommodated by the present invention to allow the panel 20 to follow the contour of the rear passenger compartment of the automobile. In the preferred embodiment, the abrasion 19 is customized text and/or an artistic design which is formed in the face 1 of the panel 20 by water pressure, sand blasting or laser etching, which allows each wind blocking device to be custom designed based upon a customer's requirements.

Figure 7A:
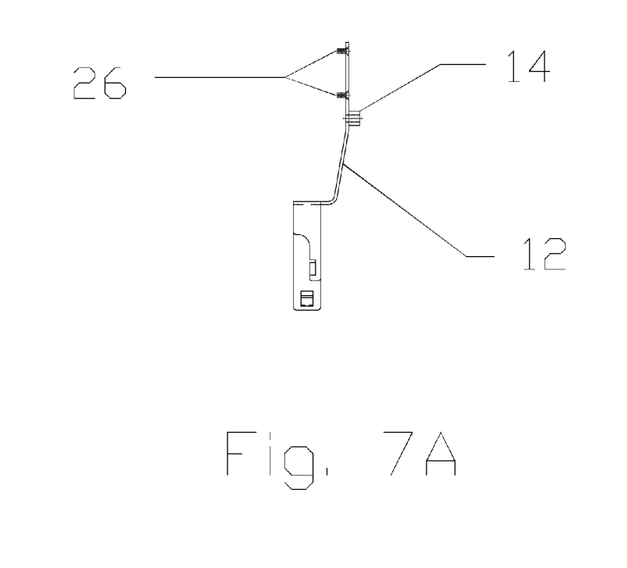
FIG. 7 illustrates a frame bracket for a convertible automobile.
Figure 7B:
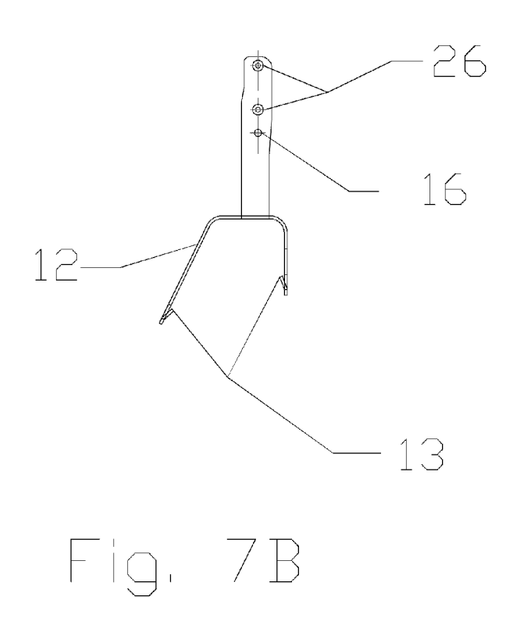
Figure 8:
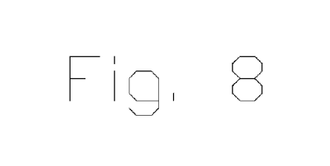
FIG. 8 illustrates several views of an anchor that is used to secure the frame bracket to the convertible automobile.
Figure 8A:
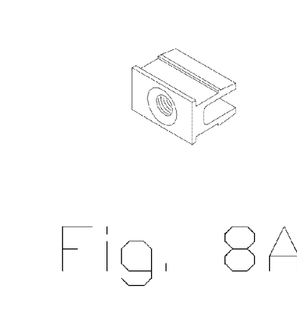
Figure 8B:
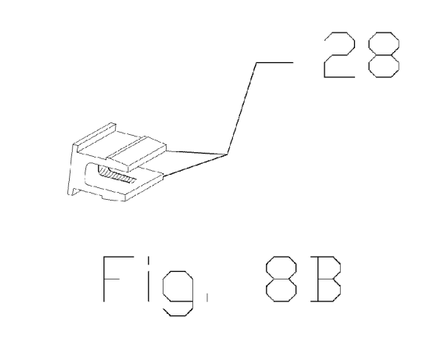
Figure 8C:
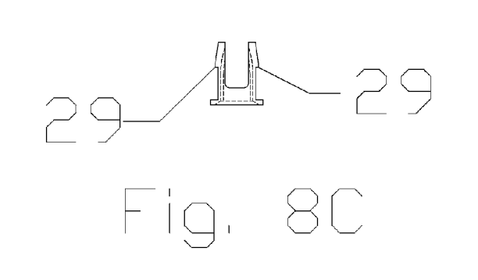
Figure 8D:
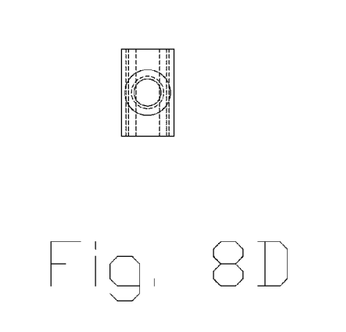
Figure 8E:
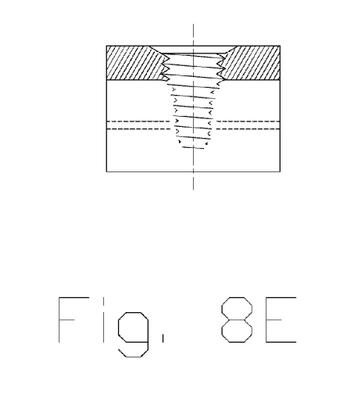
Figure 9:
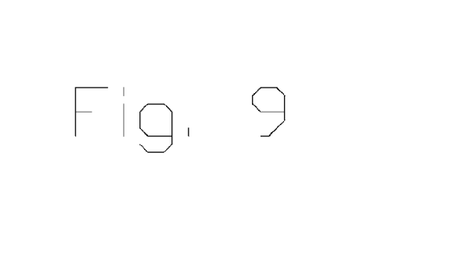
FIG. 9 illustrates the panel bracket which is used to secure the panel to the frame bracket.
Figure 9A:
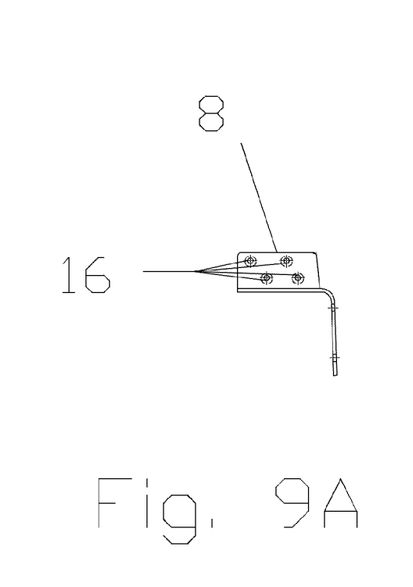
Figure 9B:
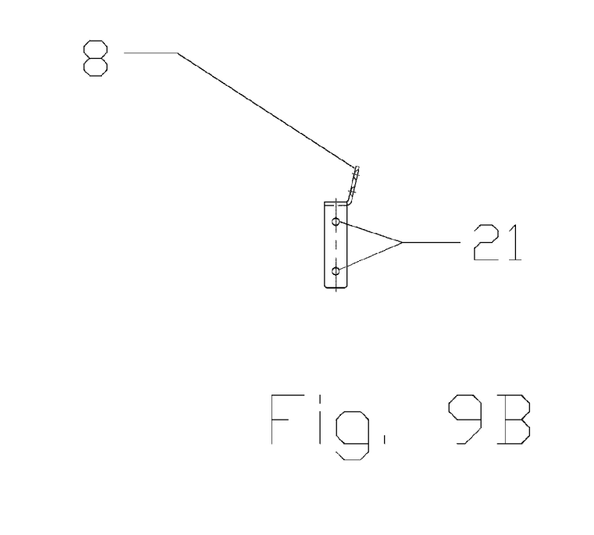
Figure 10:
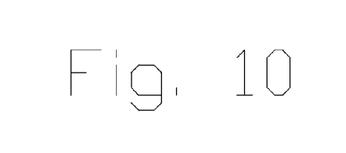
FIG. 10 illustrates a panel bracket plate which is used to secure the panel to the panel bracket.
Figure 10A:
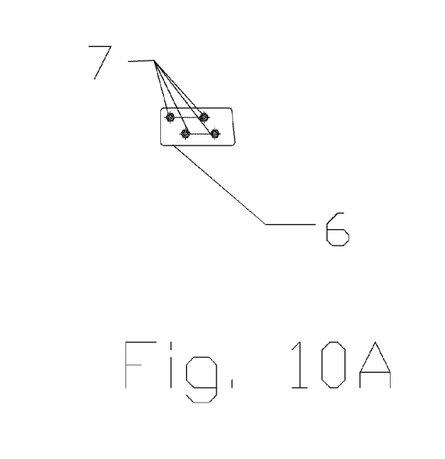
Figure 10B:
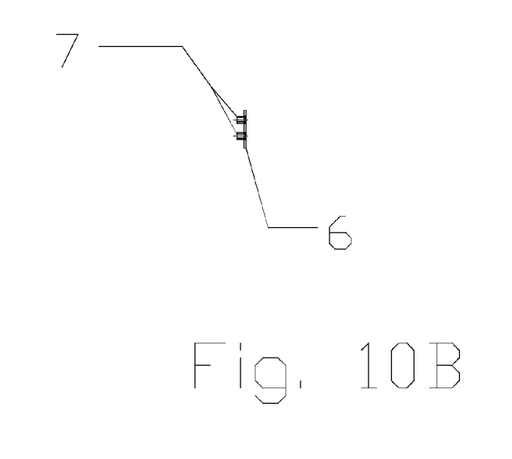
Figure 11:
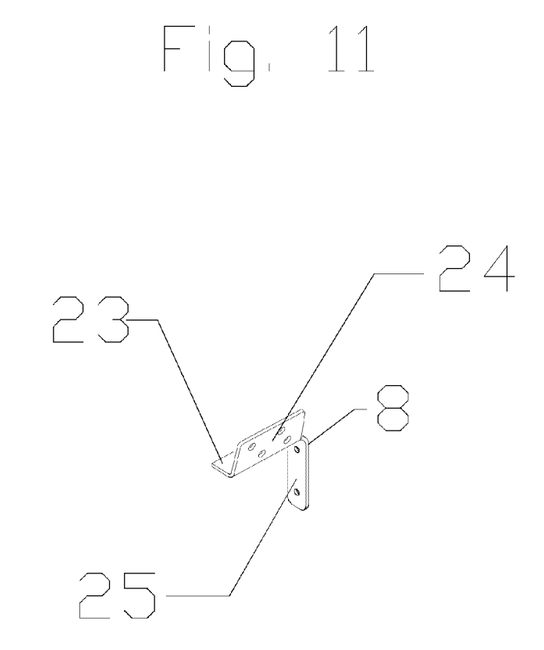
FIG. 11 further illustrates the panel bracket which is used to secure the panel to the frame bracket.
Figure 12:
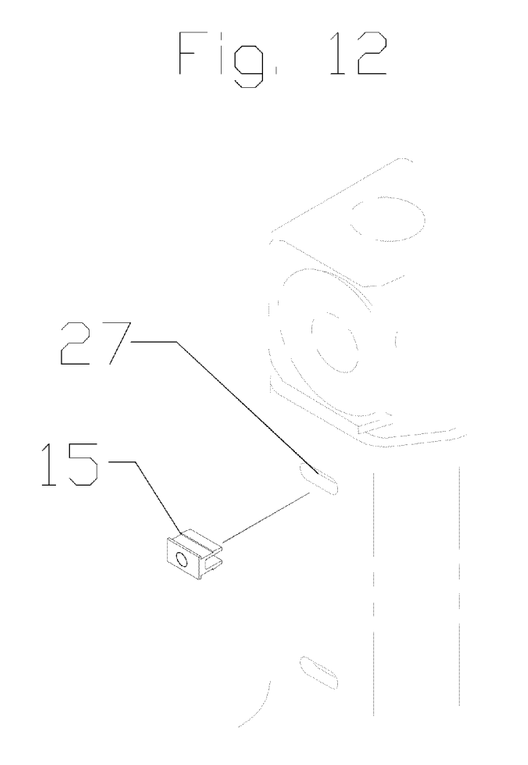
FIG. 12 illustrates the method of attaching the anchor to the convertible automobile.
Figures 13, 13B:
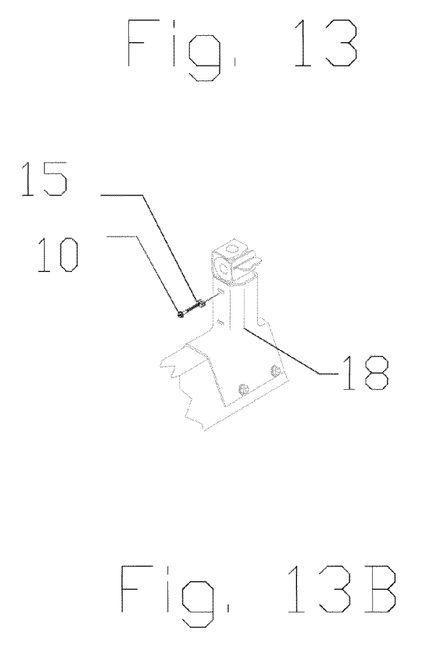
FIG. 13 further illustrates the method of attaching the anchor to the convertible automobile.
Figure 13A:
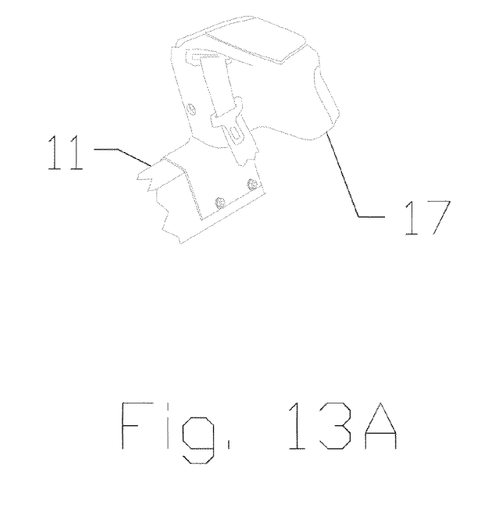
Figure 13C:
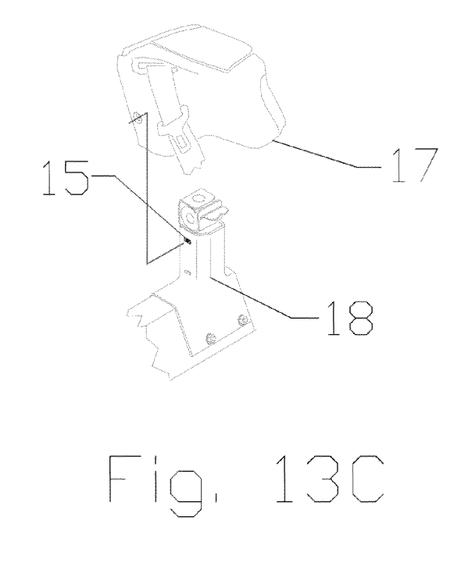
Figure 14A:
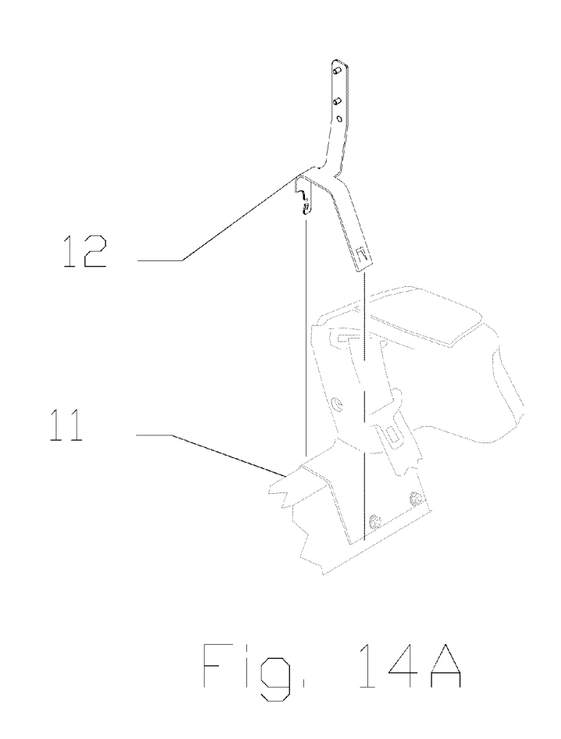
FIG. 14 illustrates the method of attaching the frame bracket to the convertible automobile.
Figure 14B:
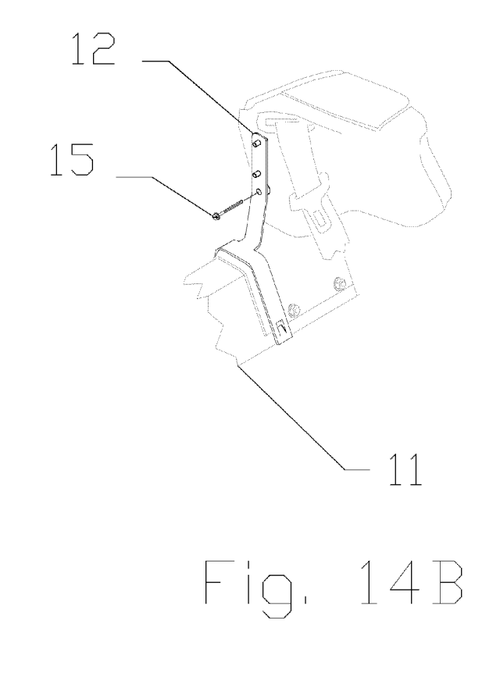

In the preferred embodiment, a means of illumination is a strip of light emitting diodes (LEDs) which are readily known in the art and which are affixed to the edge 4 of the panel 20. Affixing the LED strip to the edge 4 of the panel 20 allows light to pass through the panel 20 and become diffused at the abrasion 19 such that the abrasion 19 is illuminated to observers. In the preferred embodiment, the means of attaching the panel 20 to the convertible automobile comprises a panel bracket plate 6, a panel bracket 8, a frame bracket 12, an anchor 15, four screws 9, two nuts 30 and a bolt 10. The panel bracket plate 6 comprises a flat metal plate with mounting bosses 7 arranged in such a way as to align with one set of the holes 5 in the panel 20. The panel bracket 8 comprises a stamped sheet metal plate comprising a bottom tab 23, a front tab 24 and a side tab 25, with holes 16 in the front tab 24 arranged in such a way as to align with the mounting bosses 7 of the panel bracket plate 6 and holes 21 arranged in such a way as to align with threaded studs 26 the frame bracket 12. In the preferred embodiment, the bottom tab 23 and the side tab 25 form an angle of approximately 90 degrees and the bottom tab 23 and the front tab 24 form an angle of approximately 102 degrees. However, it should be understood that any number of angles could be accommodated by the present invention to allow the panel bracket 8 to align with both the panel 20 and the frame bracket 12. The panel bracket 8 is installed onto the panel 20 by attaching the panel bracket 8 to a front side of the panel 20 with the holes 16 of the panel bracket 8 aligned with one set of the holes 5 of the panel 20. The panel bracket plate 6 is installed onto the panel 20 by attaching the panel bracket plate 6 to a rear side of the panel 20 opposite the panel bracket 8 with the mounting bosses 7 of the panel bracket plate 6 aligned with one set of the holes 5 of the panel 20. Screws 9 are affixed to the mounting bosses 7 by installing the screws 9 through the holes 16 in the panel bracket and the corresponding set of holes 5 in the panel 20. A seat belt tower trim 17 is removed from a seat belt tower 18 pursuant to the manufacturer's directions. An anchor 15 is inserted into an existing slot 27 on the seat belt tower 18 as depicted in FIG. 7. The seat belt tower trim 17 is then reinstalled on the seal belt tower 18. The frame bracket 12 comprises a sheet metal stamping which is bent to fit the contours of the seat belt tower 18 of the automobile, two tabs 13, a hole 22, a spacer 14 and two threaded studs 26. The frame bracket 12 is attached to the automobile by placing the frame bracket 12 over the seat belt tower 18 and pressing it down onto the seat belt tower 18 until the tabs 13 engage an edge of the seatbelt tower 18. A bolt 10 is inserted through the hole 16 and affixed to the anchor 15. The anchor 15 is adapted to fit snugly inside the existing slot 27 in the seat belt tower 18. Inserting the bolt 10 into the anchor 15 causes flanges 28 on the anchor 15 to press firmly against inside edges of the existing slot 27 in the seat belt tower 18. Raised lips 29 on the flanges 28 prevent the removal of the anchor 15 from the existing slot in the seat belt tower 18 without first removing the bolt 10. The panel bracket 8 is attached to the frame bracket 12 by aligning the holes 21 with the threaded studs 26 and tightening bolts 30 onto the threaded studs 26 such that the panel bracket is situated between the frame bracket 12 and the bolts 30.

Figure 15A:
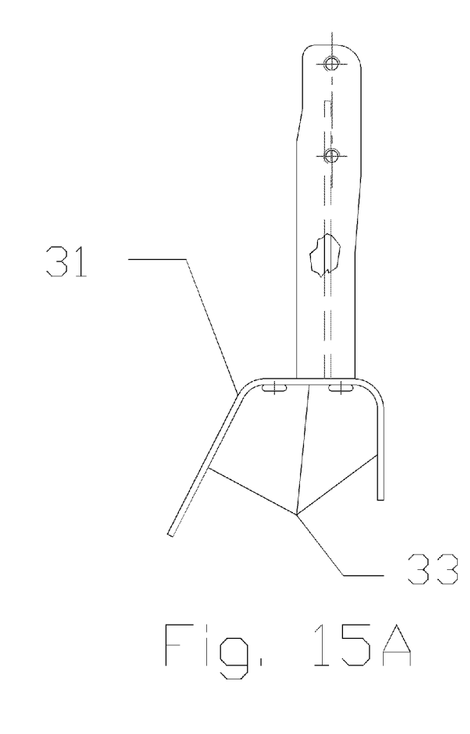
FIG. 15 illustrates a modified frame bracket for a convertible automobile.
Figure 15B:
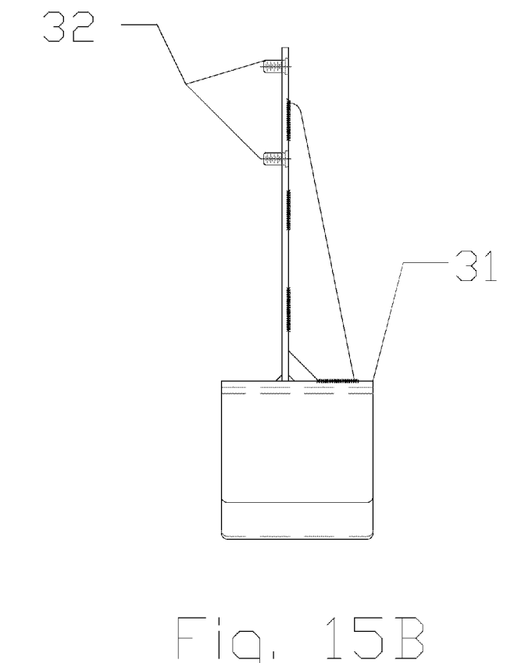

The present invention can be easily adapted to another a-convertible automobile by modifying the frame bracket 12. A preferred embodiment of the invention for another convertible automobile the is the same as the previous embodiment except that the anchor 15 is not used and the a modified frame bracket 31 is used in place of the frame bracket 12. The modified frame bracket 31 comprises a sheet metal stamping which is bent to fit the contours of a frame member 11 of a convertible automobile, and two threaded studs 32. The modified frame bracket 31 is attached to the convertible automobile by attaching two sided high bonding strength tape which is known by one knowledgeable in the art to a bottom 33 of the modified frame bracket 31 and placing the modified frame bracket 31 over the frame member 11 and pressing it down firmly onto the frame member 11. The panel bracket 8 is attached to the modified frame bracket 31 in the same fashion as the panel bracket 8 is attached to the frame bracket 12.

Although a preferred embodiment uses a transparent or translucent acrylic panel, it should be understood that the panel 20 of the wind blocking device can be manufactured from any number of materials capable of redirecting air flow through the passenger compartment of the Corvette and which are known in the art, i.e., ABS plastic, plexi-glass, lexan, aluminum, screen mesh, and so forth. Additionally, while the preferred embodiment utilizes an LED strip for illuminating a transparent or translucent panel 20, it should also be understood that the means of illuminating the abrasion 19 could be any number of means of illumination known in the art and such illumination can be white, a single color, or multi-colored. The means of illumination can be powered by its own independent power source or powered by the automobile's power system. In either case, the means of illumination can utilize its own switch to control the flow of electricity. However, if powered by the automobile's power system, the means of illumination can also be connected to the automobile's electrical system such that the automobile's electrical system controls the flow of electricity such that the means of illumination may be always on, on when the vehicle's ignition switch is in the "accessory" or "on" position, or on when one or more of the automobile's lights are on, such as the parking lights, brake lights or head lights.

Although it is anticipated that the abrasion 19 will be formed by water pressure, sand blasting or laser etching, it should also be understood that the invention is not dependent on any particular manner of forming the abrasion 19. The formation of the abrasion 19 can be accomplished by any number of methods known to one skilled in the art.

Figure 1:
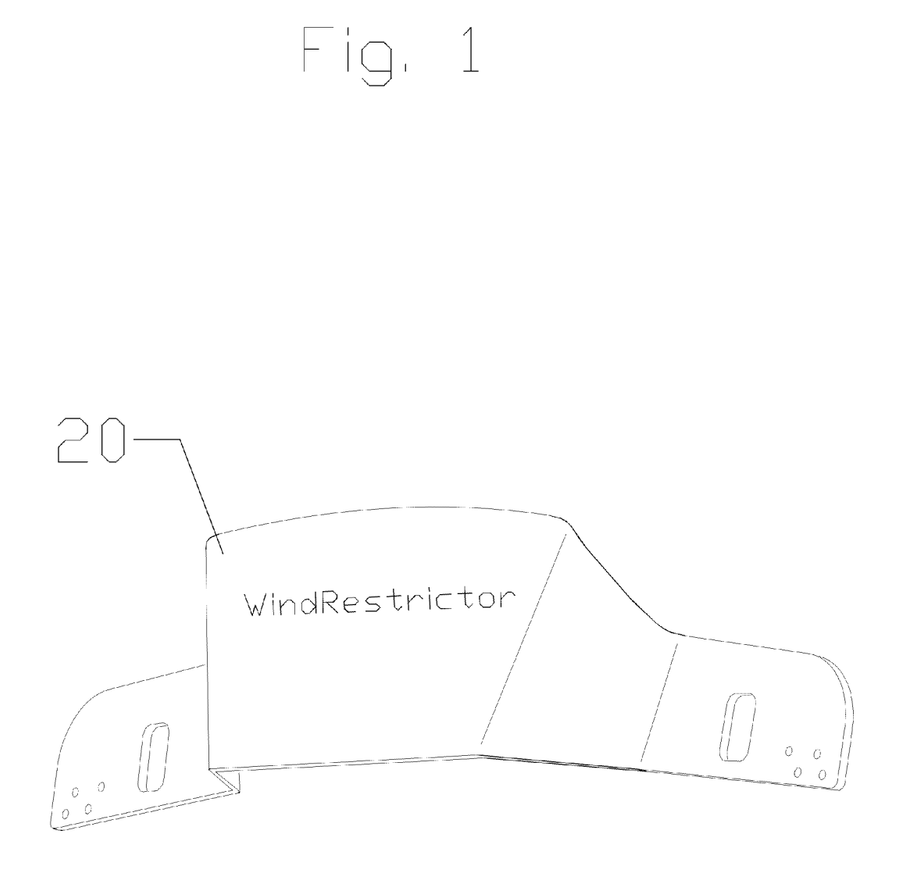
FIG. 1 is a preferred embodiment of the panel of the wind blocker.
Figure 2:
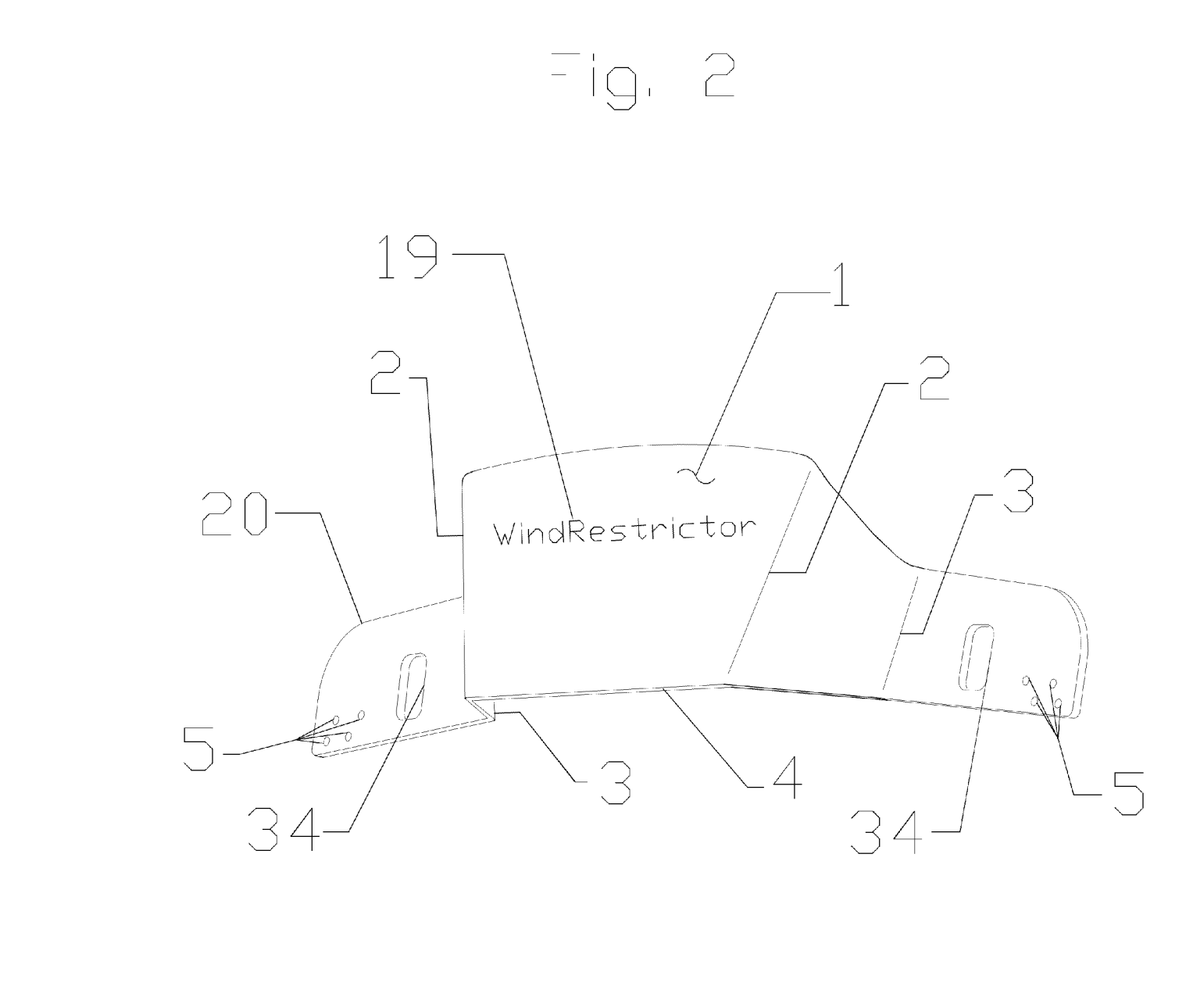
FIG. 2 is a preferred embodiment of the panel of the wind blocker with various details identified.
Figure 3:
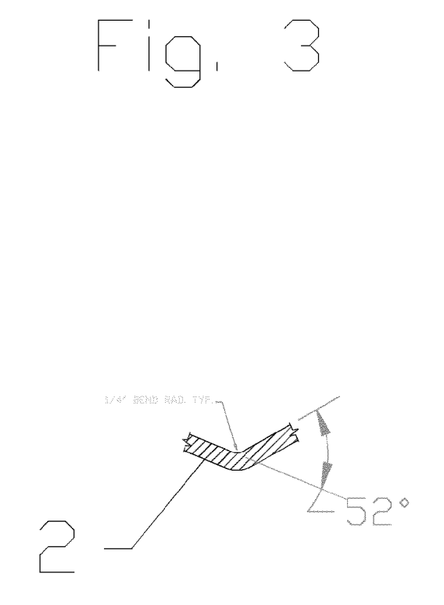
FIG. 3 depicts one of the bends in the panel of the wind blocker.
Figure 4:
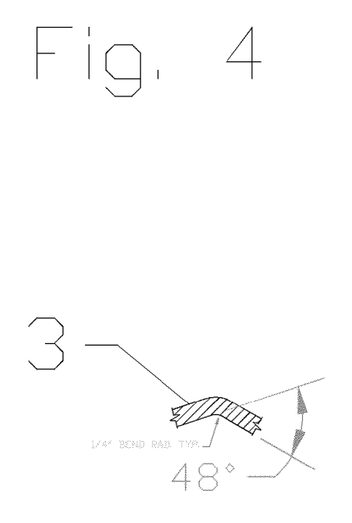
FIG. 4 depicts another of the bends in the panel of the wind blocker.
Figure 5:
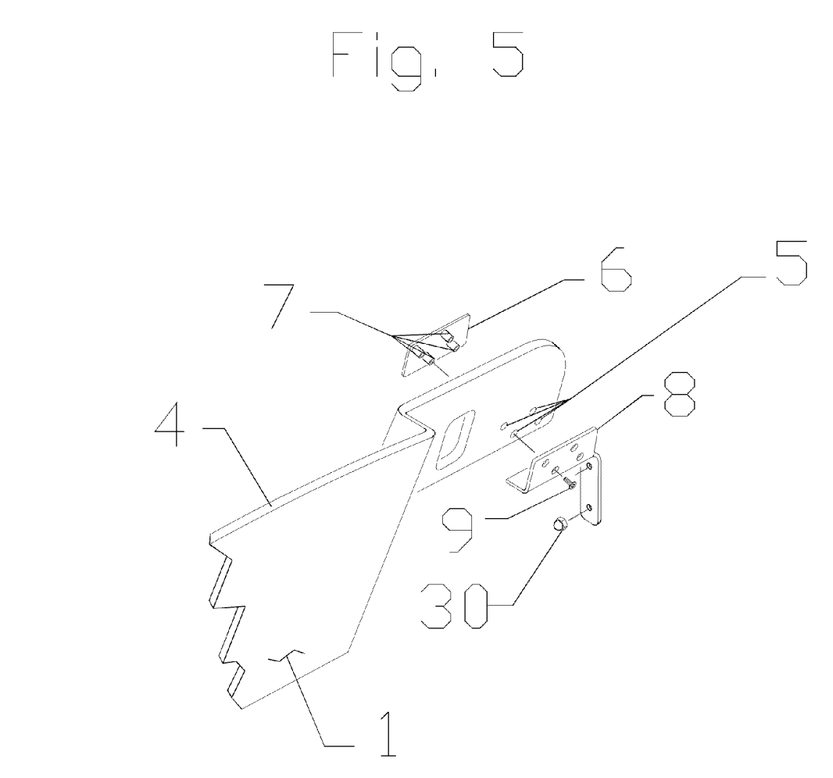
FIG. 5 illustrates the panel and a portion of a mounting assembly that is used to secure the panel to the convertible automobile.
Figure 6:
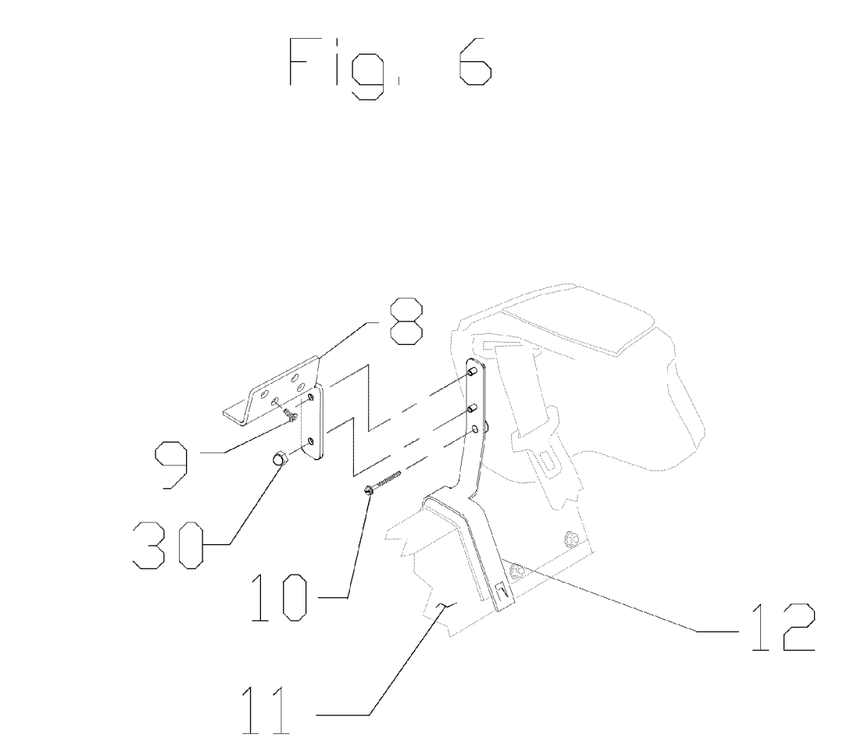
FIG. 6 further illustrates the panel and a preferred embodiment of the mounting assembly that is used to secure the panel to the convertible automobile.

It should be understood that the geometry of the panel 20 in FIG. 1 is based upon the contours of a particular convertible automobile. The geometry of the panel 20 can be manufactured with a wide range of geometries capable of fitting behind passenger seats of the convertible automobile by one skilled in the art. FIG. 5 through FIG. 14 depict the preferred embodiment of the means for affixing the panel 20 to a convertible automobile.

Although the invention has been described in detail with reference to a particular embodiment, it is to be understood that variations or modifications may be made within the spirit and scope of the invention as defined in the appended claims.

What is claimed is:

1. A wind blocking device for a convertible automobile comprising:
   a wind blocker adapted to be arranged behind seats of said automobile and projecting upward beyond a seat belt tower of said automobile, said wind blocker comprising:
   a panel that extends from a first seatbelt tower to a second seatbelt tower, and having a face and an edge;
   two first bends located an equal distance from a centerline of said panel, wherein the first bend changes the angle of the panel;
   two second bends located an equal distance from said first bends, wherein the second bend changes the angle of the panel;
   two seat latch cutouts, wherein each cutout is arranged on the panel at a location that allows access through the panel to a seat latch disposed on a backside of a headrest; and
   a mounting assembly.

2. The wind blocking device of claim 1 wherein said mounting assembly comprises:
   a panel bracket plate, a panel bracket, a frame bracket, screws and nuts;
   wherein the panel bracket plate and the panel bracket are disposed on opposite sides of the panel; and wherein the frame bracket is adapted to attach to a seatbelt tower of the convertible automobile and to the panel bracket.

3. The wind blocking device of claim 2 wherein said panel bracket plate comprises a flat plate with multiple mounting bosses.

4. The wind blocking device of claim 3 wherein said panel bracket comprises a stamped sheet metal plate with multiple holes aligned with the mounting bosses on the panel bracket plate and threaded studs on the frame bracket.

5. The wind blocking device of claim 4 wherein said mounting assembly further comprises an anchor and a bolt.

6. The wind blocking device of claim 5 wherein said frame bracket comprises a stamped sheet metal plate which is bent into a generally u-shaped member comprising two free-standing members to fit opposing sides of contours of a seat belt tower of a convertible automobile, each of the free-standing members comprising tabs to engage an edge of said seat belt tower, and a vertically oriented member comprising multiple threaded studs arranged to fit holes in the panel bracket.

7. The wind blocking device of claim 6 wherein said anchor comprises a metal clip with flanges adapted to fit snugly inside an existing slot in said seat belt tower, and a threaded hole in said metal clip adapted such that the bolt threaded into such threads presses against an inside edge of said flanges securing said anchor firmly to said seat belt tower.

8. The wind blocking device of claim 7 wherein said panel bracket is further attached to said seat belt tower by threading said bolt into said anchor with said panel bracket situated between the bolt and anchor.

9. The wind blocking device of claim 4 wherein said frame bracket comprises a stamped sheet metal plate which is bent to fit the contours of a frame member of a convertible automobile and multiple threaded studs arranged to fit holes in the panel bracket.

10. The wind blocking device of claim 8 or claim 9, wherein said panel is constructed of a transparent or translucent material.

11. The wind blocking device of claim 8 or claim 9, further comprising abrasion on said face and a means of illumination.

12. The wind blocking device of claim 11, wherein said means of illumination is light emitting diodes.

13. The wind blocking device of claim 12, wherein said means of illumination is electrically connected to an electrical circuit of said automobile.

14. The wind blocking device of claim 13, wherein said electrical circuit is a brake light circuit of said automobile.

15. The wind blocking device of claim 14 wherein said light emitting diodes are arranged in a strip.

16. The wind blocking device of claim 15 wherein said strip is affixed to the edge of the panel.

17. The wind blocking device of claim 16, wherein said abrasion is laser etched.

18. The wind blocking device of claim 16, wherein said abrasion is sand blasted.

19. The wind blocking device of claim 16, wherein said abrasion is formed by water pressure.

20. The wind blocking device of claim 1, wherein the first bend is at an angle of 52 degrees and the second bend is at an angle of 48 degrees.

\* \* \* \* \*